(12) United States Patent
Ting

(10) Patent No.: US 7,670,168 B2
(45) Date of Patent: Mar. 2, 2010

(54) CARD CONNECTOR FOR CONNECTING WITH TWO CARDS

(75) Inventor: Chien-Jen Ting, Tu-cheng (TW)

(73) Assignee: Hon Hai Precision Ind. Co., Ltd., Taipei Hsien (TW)

(*) Notice: Subject to any disclaimer, the term of this patent is extended or adjusted under 35 U.S.C. 154(b) by 0 days.

(21) Appl. No.: 12/316,147

(22) Filed: Dec. 10, 2008

(65) Prior Publication Data

US 2009/0149058 A1 Jun. 11, 2009

(30) Foreign Application Priority Data

Dec. 10, 2007 (TW) .............................. 96146963 A

(51) Int. Cl.
*H01R 13/64* (2006.01)
(52) U.S. Cl. ..................... 439/377; 439/541.5; 439/630
(58) Field of Classification Search ................. 439/377, 439/64, 541.5, 630, 159
See application file for complete search history.

(56) References Cited

U.S. PATENT DOCUMENTS

| 5,490,791 | A | * | 2/1996 | Yamada et al. | 439/159 |
|---|---|---|---|---|---|
| 6,045,366 | A | * | 4/2000 | Motomu | 439/64 |
| 6,059,586 | A | | 5/2000 | Watanabe | |
| 6,109,968 | A | * | 8/2000 | Wang | 439/607.01 |
| 6,120,322 | A | | 9/2000 | Ho | |
| 6,231,382 | B1 | * | 5/2001 | Yu | 439/541.5 |
| 6,540,563 | B1 | * | 4/2003 | Hu et al. | 439/676 |
| 7,189,088 | B2 | | 3/2007 | Cheng | |
| 7,318,746 | B2 | * | 1/2008 | Ezaki | 439/541.5 |
| 2006/0196781 | A1 | | 9/2006 | Kimura | |
| 2006/0250757 | A1 | * | 11/2006 | Ezaki | 361/600 |
| 2009/0068882 | A1 | * | 3/2009 | Ting | 439/541.5 |
| 2009/0093141 | A1 | * | 4/2009 | Ting | 439/65 |

* cited by examiner

*Primary Examiner*—Hae Moon Hyeon
(74) *Attorney, Agent, or Firm*—Andrew C. Cheng; Wei Te Chung; Ming Chieh Chang

(57) ABSTRACT

A card connector (100) includes a first housing (1), a second housing (2) stacked with the first housing, and a pair of standoffs (7). The first housing includes a first shell (10) having a first main body (11) comprising a pair of clasps (15). The second housing includes a second shell (20) having a second main body (22) and a pair of side walls (21) extending from the second main body, and each side wall has a plurality of elastic pieces (210, 211, 212). The standoffs mounted on opposite lateral sides of the first shell and the second shell. Each standoff comprising a fixing plate (71) and a locking piece (72) extending towards to the first shell from the fixing plate. The fixing plate has a plurality of through holes (74, 75) to assemble with corresponding elastic pieces of the second shell, and each locking piece provides with a locking hole (720) to fasten with corresponding clasps of the first shell.

16 Claims, 6 Drawing Sheets

CARD CONNECTOR FOR CONNECTING WITH TWO CARDS

BACKGROUND OF THE INVENTION

1. Field of the Invention

The present invention relates to a card connector, and particularly to a card connector which includes a stand off adapted to mounted on a printed circuit board.

2. Description of Prior Arts

Memory cards are known in the art and contain intelligence in the form of a memory circuit or other electronic program. Some form of card reader reads the information or memory stored on the card. Memory cards are used in many applications in today's electronic society, including video cameras, smartphones, music players, ATMs, cable television decoders, toys, games, PC adapters and other electronic applications. A typical memory card includes a contact or terminal array for connection through an electrical connector to a card reader system and then to external equipment. The connector readily accommodates insertion and removal of the card to provide quick access to the information and program on the card. The card connector includes terminals for yieldably engaging the contact or terminal array of the card.

Memory card connectors that allow two memory cards to be simultaneously connected to a single memory card are also available in the market. Such a memory card connector usually comprises two connectors, and each connector is capable of receiving one memory card and stacked with the other. Example is disclosed in U.S. Pat. No. 2006/0196781. Such a stacked card connector comprises an upper connector and a lower connector stacked with the upper connector. The upper connector and the lower connector each has an insulative body. On a rear end of each insulative body, a pair of fixing holes are defined for screws fastened therein orderly. Thus, the upper connector and the lower connector are mounted with each other to receive a card simultaneously.

However, the screws is only mounted on the rear portion of the stacked card connector, and there is no fastening feature fixed on the former portion thereof. Therefore, when the card connector is in assembly or in operation, the former portion of the card connector will be loosen. As a result, it is possible that the upper connector and the lower connector will move away form each other. Thus, a special fastening feature is needed to assembly the upper one and the lower one together. Thus, a special fastening feature is needed to assembly the upper one and the lower one together.

Therefore, the present invention is directed to solving the problem by providing a card connector which has a mini structure.

SUMMARY OF THE INVENTION

The present invention provides an electrical card connector comprises a printed circuit board defining opposite first and second surfaces, a first connector unit positioned upon the first surface, and a second connector unit positioned upon the second surface. The first connector unit defines an essentially complete rectangular receiving space and the second connector unit defines an L-shaped receiving space and an unused space at its corner. A mating connector is located in the corner to electrically connect to the first connector unit and the second connector unit.

The present invention also provides a card connector includes a first housing, a second housing stacked with the first housing, and a pair of standoffs. The first housing includes a first shell having a first main body comprising a pair of clasps. The second housing includes a second shell having a second main body and a pair of side walls extending from the second main body, and each side wall has a plurality of elastic pieces. The standoffs mounted on opposite lateral sides of the first shell and the second shell. Each standoff comprises a fixing plate and a locking piece extending towards to the first shell from the fixing plate. The fixing plate has a plurality of though holes to assemble with corresponding elastic pieces of the second shell, and each locking piece provides with a locking hole to fasten with corresponding clasps of the first shell.

Other objects, advantages and novel features of the invention will become more apparent from the following detailed description of the present embodiment when taken in conjunction with the accompanying drawings.

DETAILED DESCRIPTION OF THE PREFERRED EMBODIMENT

Referring to FIG. 1 to FIG. 6, the present invention provides a card connector 100 adapted to receive two cards with different size and dimension. In other embodiment, the card connector also can be designed to allow two cards with simple type to be inserted or removed.

Figure 1:
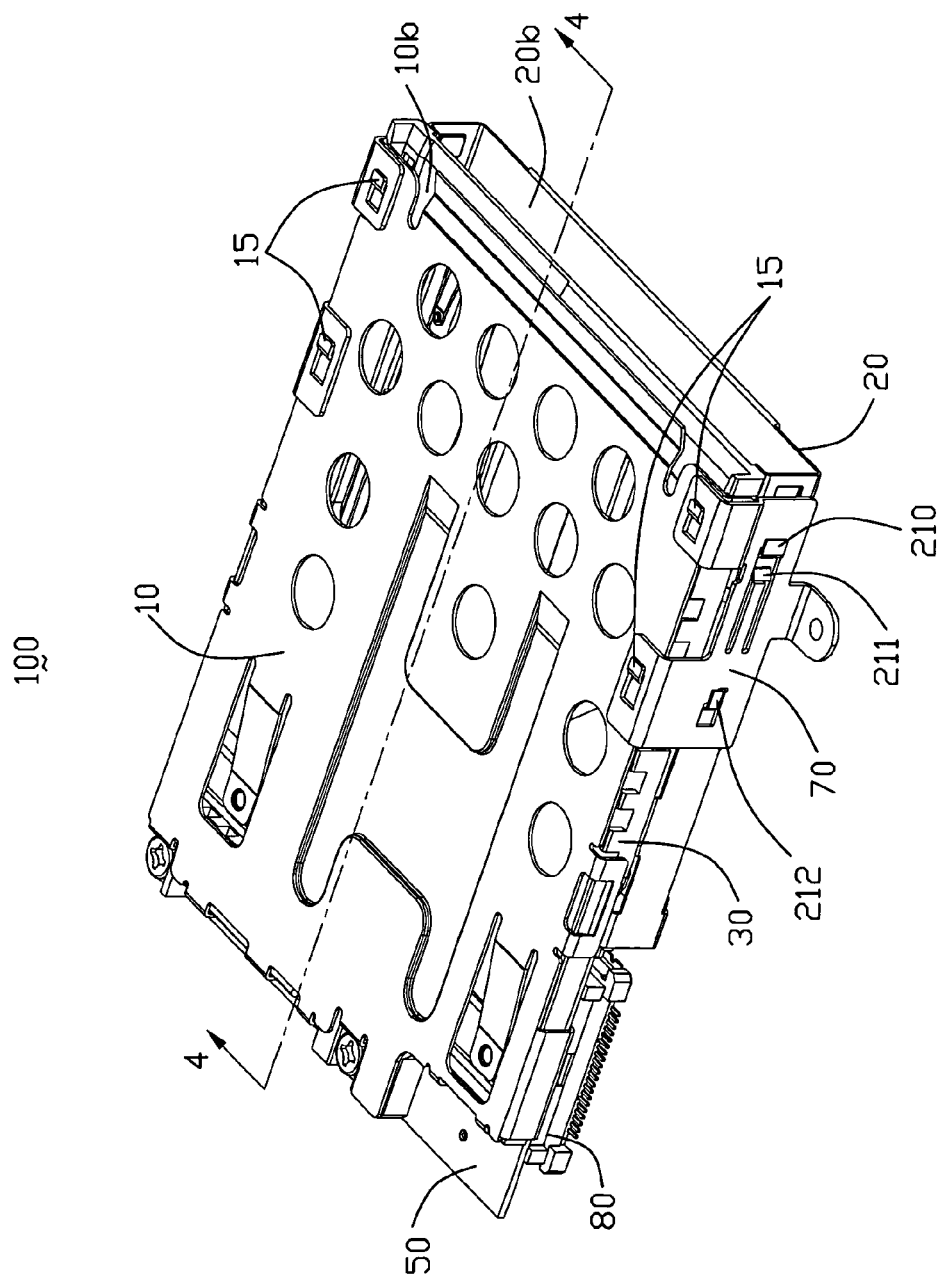
FIG. 1 is a perspective view of a card connector of present invention.
Figure 2:
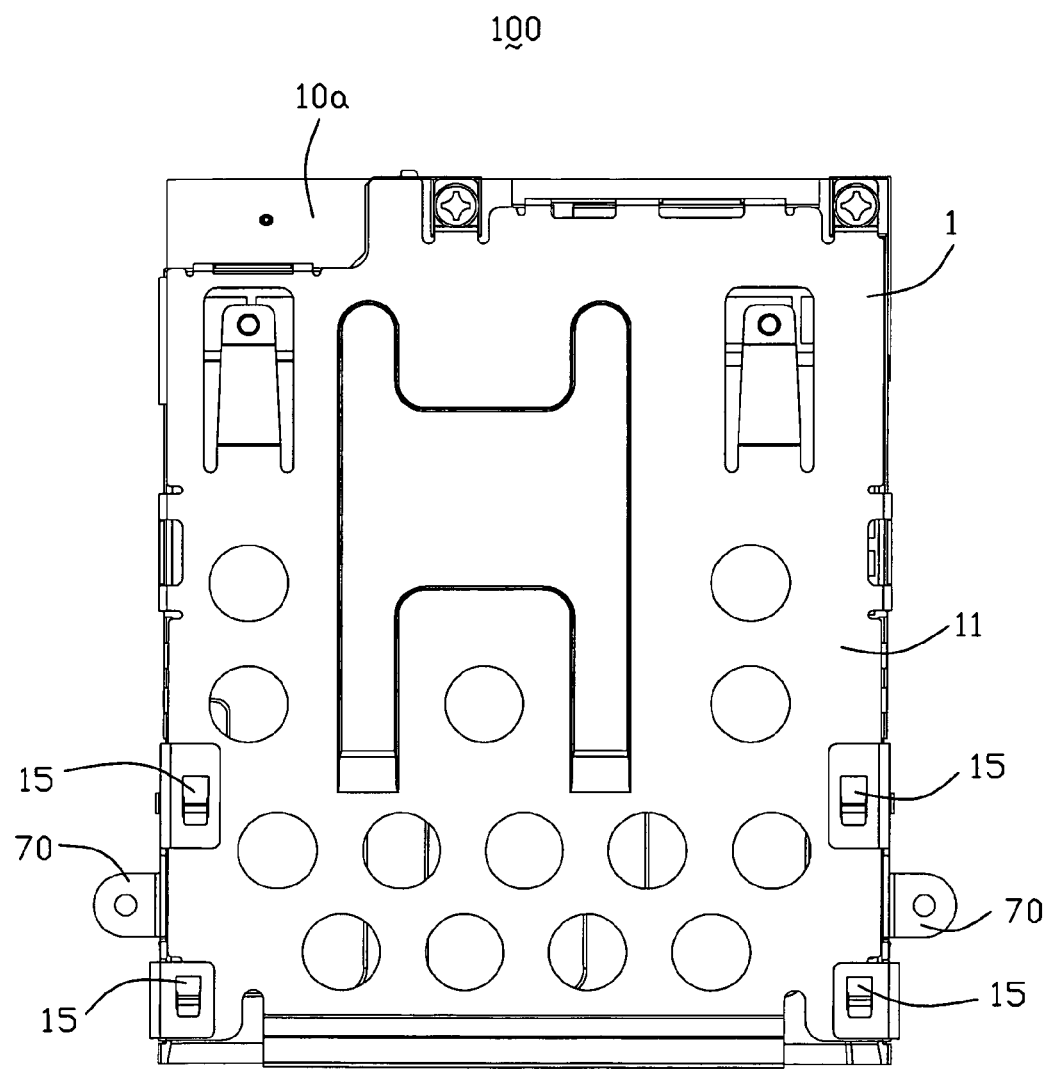
FIG. 2 is a plan view of the card connector of present invention as shown in FIG. 1.
Figure 3:
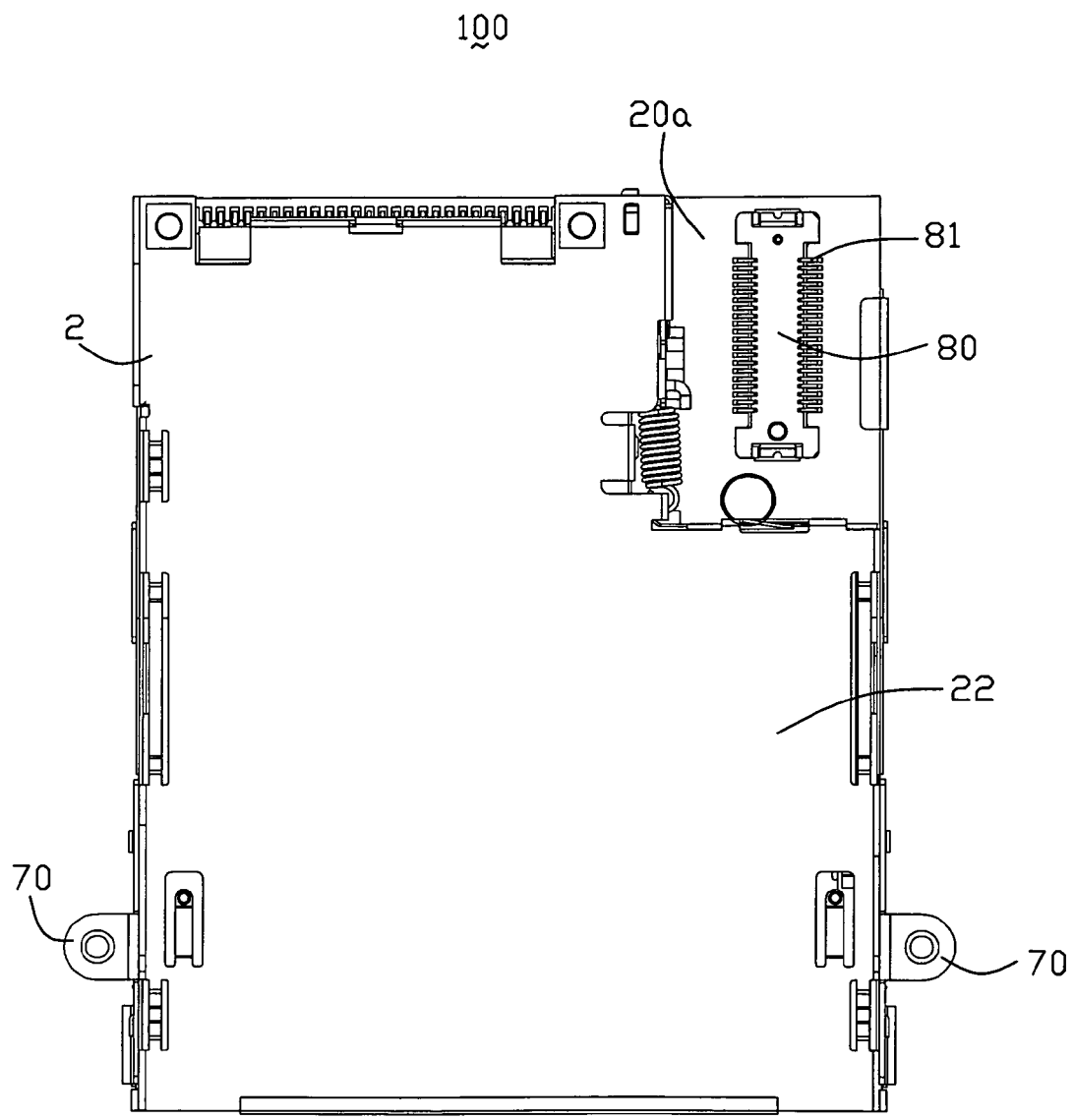
FIG. 3 is a plan view of the card connector of present invention as shown in FIG. 2 in another aspect.
Figure 4:
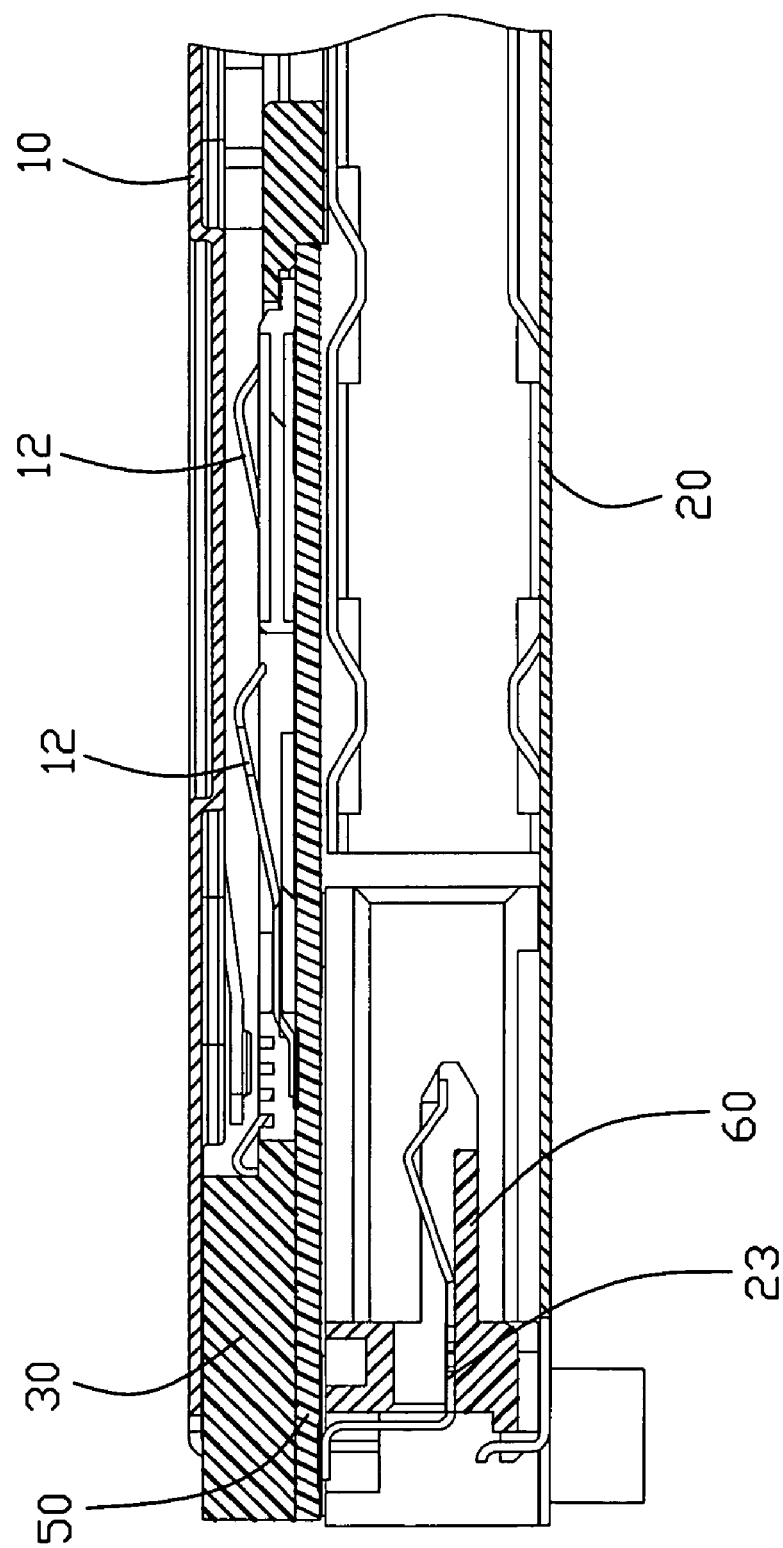
FIG. 4 is a cross view of the card connector of present invention in FIG. 1 taken along line 4-4.

In reference to FIG. 1 to FIG. 3, the card connector 100 comprises a first rectangular housing 1 having a first void space 10a and a first guiding space 10b adapted to guide a first card inserted towards an insertion direction, and a second rectangular housing 2 stacked with the first housing 1 and having a second void space 20a and a second guiding space 20b for guiding a second card inserted towards the insertion direction. The first guiding space 10b is defined by a first shell 10 associating with a first insulative body 30 providing with a plurality of first terminals 12 (as shown in FIG. 4) in the first guiding space 10b The second guiding space 20b is defined by a second shell 20 mounted on a second insulative body 60 for receiving a plurality of second terminals 23. In this preferred embodiment, the first guiding space 10b, which can be also named the first receiving space, is of a rectangular shape, and the second guiding space 20b, which can be also named the second receiving space, is L-shaped. The first void space 10a is of rectangular shape and placed at a back corner of the first housing 1 along the insertion direction as well as the second void space 20a located at the back corner of the second housing 2. The first void space 10a and the second void space 20a are placed short of and adjacent to the first guiding space 10b and the second guiding space 20b, respectively.

To be continued with FIG. 4, the first terminals 12 are arranged in two rows along the insertion direction for connecting with the first card, such as a Smart card. The second terminals 23 are placed in one row and projects into the first guiding space 10b adapted to selectively engaging with the second cards of different width, such as Express card. In preferable embodiment, the first terminals 12 are located in the first guiding space 10b completely, and the second terminals 23 partially extend into the second guiding space 20b and partially dispose out of the second guiding space 20b. Thus, in a back view opposite to the insertion direction, only the first terminals 12 can be seen.

Together with FIG. 2 to FIG. 4, a printed circuit board 50 is sandwiched between the first housing 1 and the second housing 2, and protrudes partially into the first void space 10a and the second void space 20a. A mating connector 80 having a plurality mating terminals 81 is located on the printed circuit board 50 in the second void space 20a. In other embodiment, the mating connector 80 also can be placed in the first void space 10a on the other interface of the printed circuit board 50. The first terminals 12 and the second terminals 23 are assembled on opposite interfaces of the printed circuit board 50 to connect with the mating terminals 81 of the mating connector 80 electrically. In preferable embodiment, the mating terminals 81 are positioned in two rows and arranged along the insertion direction.

The first shell 10 is made of metal material and comprises a main body 11 covering the first insulative body 30 as shown in FIG. 4. On the main body 11, two pairs of first mounting section 15 are formed on the second main body 11 adjacent to a card-in port of the second housing 2. Preferably, the first mounting sections 15 are designed as clasps 15 in this embodiment of present invention.

Figure 5:
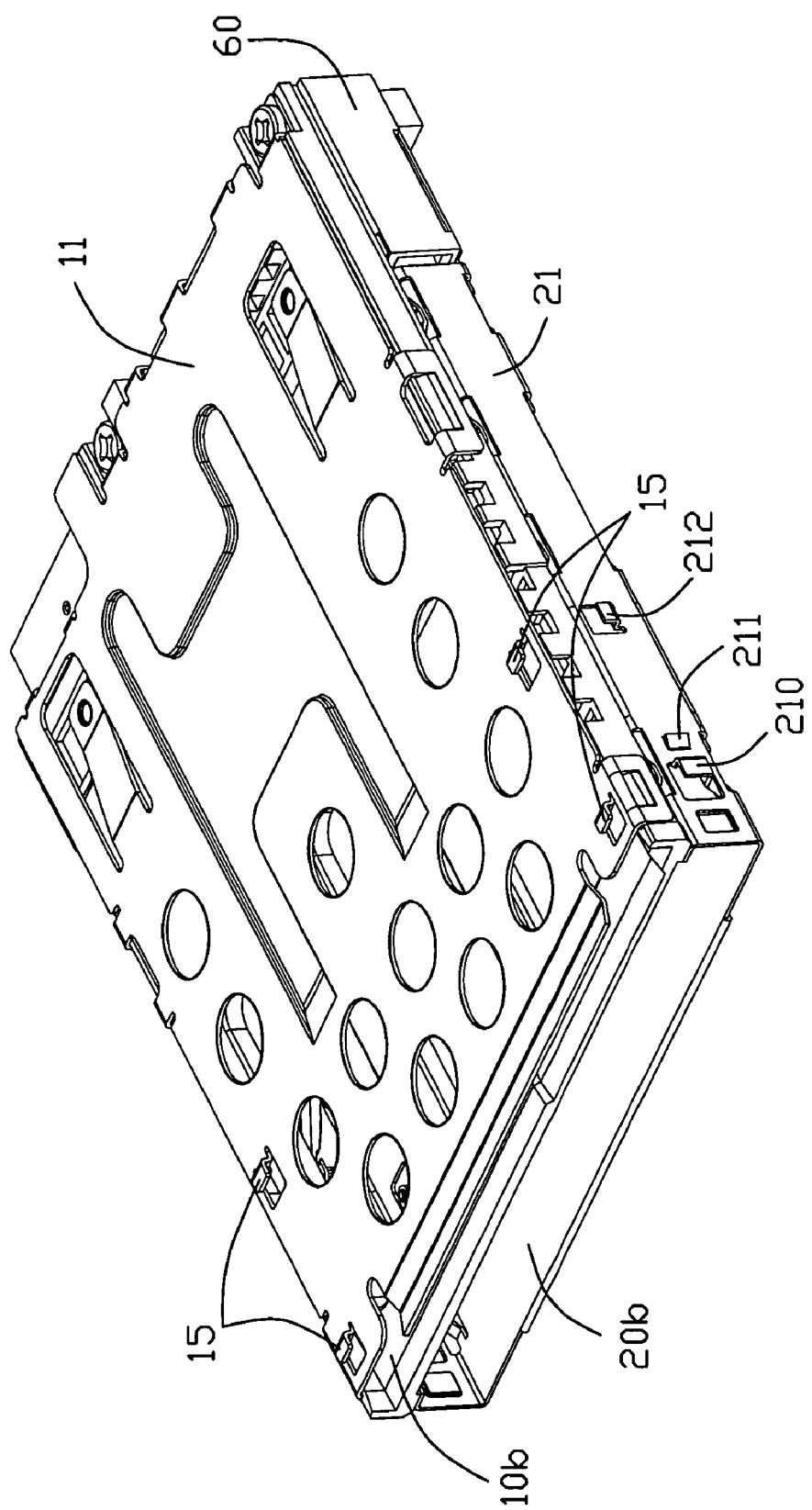
FIG. 5 is a perspective view of the card connector without of a pair of standoffs thereof.

The second shell 20 is also stamped by a metal plate and comprises a second main body 22 and a pair of side walls 21 (as shown in FIG. 5) extending upwardly from the main body 22. Corresponding to the first mounting sections or clasps 15 of the first shell 10, each side wall 21 of the second shell 20 has a plurality of second mounting sections which are preferably designed as the first elastic piece 210 extending backwardly opposite the insertion direction, a second elastic piece 211 extending forwardly, and a third elastic piece 212 extending upwardly therefrom near to a card-in port of the first housing 1 in this embodiment of present invention.

Figure 6:
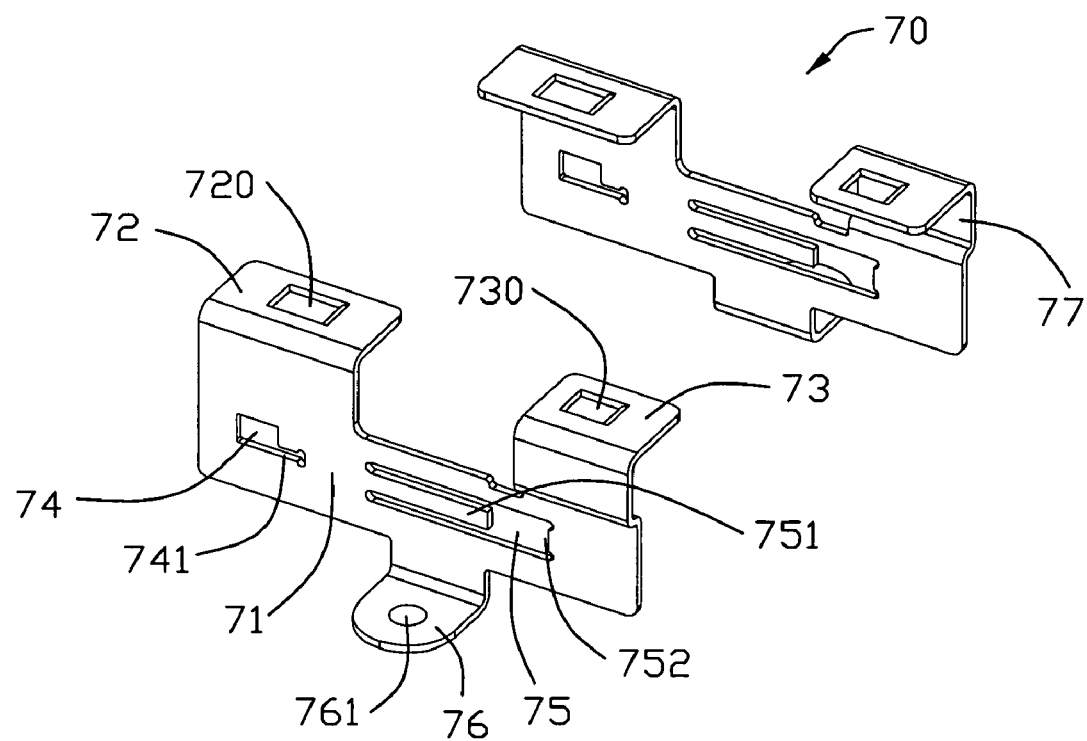
FIG. 6 is a perspective view of the pair of the standoffs of the card connector of present invention.

To fasten the first housing 1 and the second housing 2 together more firmly, there are a pair of stand offs 70 locking with the first shell 10 and the second shell 20 as show in FIG. 1 and FIG. 6. The entire height of each stand off 70 is designed in requirement according to that of the mating connector 80 and the card connector 100, in order to make a proper room between the card connector 100 and a main board (not shown) to set other device or without any room therebetween to reduce the entire height of the card connector 100. Each stand off 70 comprises a fixing plate 71, a pair of locking portions which are preferably designed as locking pieces 72, 73 extending from the fixing plate 71 towards the first shell 10, and a standing portion 76 extending from the fixing plate 71 away from the locking piece 72. Preferably, an elongating portion 77 tends and extends outwardly from the fixing plate essentially to create a holding force of the first housing 1. A mounting hole 761 is defined on the standing portion 76 for soldering fluid or a screw passing through. The standing portion 76 is provided to engage with the main board. The fixing plate 71 comprises a plurality of fastening sections which is defined as a first through hole 74 with a gap 741, a second though hole 75 with an elastic beam 751 protruding therein to define a through portion 752.

The first shell 10 and the second shell 20 are locked with the stand offs 70 in such manner that the first locking piece 210 of the second shell 20 protrudes into the second through hole 75 properly with the second locking piece 211 against the elastic beam 751 to escape from a sidewardly remove, and the third piece 212 passes though the first hole 74 and slide in the gap 741 to escape from an upwardly or downwardly remove. Each locking piece 72, 73 has a fastening section or locking hole 720, 730 in this embodiment of present invention, respectively, to fasten with the clasp 15 of the first shell 10.

In present invention, the mating connector 80 is mounted on the printed circuit board 50 without increasing the overall length of the card connector 100. Furthermore, it is unnecessary for the first terminals 12 and the second terminals 23 to extend a long distance to engage with the printed circuit board 10, only soldered on the circuit board 10 directly, and no external device capable of interfering them. Preferably, the mating connector 80 is mounted on the printed circuit board 50 which is sandwiched by the first housing 1 and the housing 2. Further, The mating connector 80 is located on the printed circuit board 50 at the second void space 20a, then the punted circuit board 50 at the first void space 10a has a great thickness by associating with the first housing 1 as shown in FIG. 1. When the printed circuit board 50 is forcibly pressed to make the mating connector 80 mate with a connector assembly which is mounted on the main board in advance, the printed circuit board 50 is more strong to endure the pressure. Essentially, the mating connector 80 can be used in either the first housing 1 or the second housing which selectively has the first void space 10a or the second void space 20a and is mounted on the printed circuit board 50 as described above to place the mating connector 80.

In this embodiment of the standoff 70 of present invention has a pair of locking pieces 72, 73 or locking section extending from an end of the fixing plate 71 toward the first shell 10 and away from the standing portion 76. Preferably, there also can form a pair of second locking pieces or locking section extending from the other end of the fixing plate toward the second shell 20 and opposite to the locking pieces 72, 73. Such that the first shell and the second shell lean against with each other between the locking pieces and the second locking pieces, further a holding force is created therebetween to achieve a more stable structure of the card connector 100. Besides, the locking pieces and the second locking piece as described above can be selectively designed.

In this embodiment of present invention, the first mounting sections of the first shell 10 are designed of clasps 15, the second mounting sections are designed of elastic pieces 210, 211, and 212, the fastening sections of the stand off 70 are of the locking hole 720, 730 and the through holes 74 and 75. In other embodiment, the structure of the first mounting section and the fastening sections or locking holes 720, 730 can be reversed, as well as the second mounting sections and the fastening sections or through holes 74 and 75.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

I claim:

1. A card connector defining an insertion direction of a card and comprising:
   a first shell comprising a first main body having a first mounting section;

a second shell coupled with the first shell to define a guiding space and having a second mounting section and a second main body opposite to the first main body of the first shell;
an insulative body receiving a plurality of terminals and mounted in the guiding space, the insulative body comprising a first insulative body receiving a plurality of first terminals and a second insulative body receiving a plurality of second terminals;
a printed circuit board sandwiched by the first insulative body and the second insulative body; and
a standoff to lock with the first shell and the second shell together, the standoff comprising a fixing portion and a locking portion extending from the fixing portion toward the first shell, the fixing portion and the locking portion having a fastening section, respectively, to mate with the second mounting section of the second shell and the first mounting section of the first shell.

2. The card connector as claimed in claim 1, wherein the standoff further comprises a standing portion extending from the fixing portion at a different side relative to the locking portion.

3. The card connector as claimed in claim 2, wherein the standoff further comprises a second locking portion extending from the fixing portion and opposite to said locking portion, and the second locking portion engages with the second main body of the second shell.

4. The card connector as claimed in claim 3, wherein the second shell further comprises a lateral wall extending from the second main body, and the second mounting section is displaced on the lateral wall.

5. The card connector as claimed in claim 1, wherein the first insulative body assembled with the first shell defines a first guiding space, and the second insulative body assembled with the second shell defines a second guiding space, there, the second terminals protrude out of the second guiding space to assemble with the printed circuit board, and the first terminals are received in the first guiding space completely to mate with the printed circuit board.

6. The card connector as claimed in claim 5, further comprising a mating connector mounted on the printed circuit board, the mating connector having a plurality of mating terminals arranged along the insertion direction.

7. The card connector as claimed in claim 6, wherein a void space is defined at a rear corner of the first guiding space along the insertion direction of the card, and the printed circuit board protrudes partially into the void space.

8. The card connector as claimed in claim 7, wherein the mating connector is mounted on the printed circuit board and in the void space.

9. The card connector as claimed in claim 8, wherein the mating terminals comprise two rows of mating terminals for connecting with the first terminals and the second terminals electrically, and each row terminals are arranged along the insertion direction.

10. The card connector as claimed in claim 1, wherein the first mounting section of the first shell is designed of a clasp, and the fastening section of the locking portion is designed of a locking hole.

11. The card connector as claimed in claim 10, wherein the second mounting section of the second shell is designed of an elastic piece, and the fastening section of the fixing plate is designed of a through hole.

12. The card connector as claimed in claim 1, wherein the stand off comprises an elongating portion tending and extending outwardly from the fixing plate essentially to create an up-hold force of the insulative body, the locking piece extend from the elongating portion.

13. An electrical card connector comprising:
a printed circuit board defining opposite first and second surfaces;
a first connector unit positioned upon the first surface;
a second connector unit positioned upon the second surface;
the first connector unit defining an essentially complete rectangular receiving space; and
the second connector unit defining an L-shaped receiving space with an unused space at a corner; wherein
a mating connector is located in said corner to electrically connect to said first connector unit and said second connector unit.

14. The electrical card connector as claimed in claim 13, wherein said mating connector is mounted upon the second surface.

15. The electrical card connector as claimed in claim 14, wherein said mating connector is adapted to be mated with a complementary connector which is mounted upon a main board onto which the connector is secured.

16. The electrical card connector as claimed in claim 15, wherein said card connector includes a standoff for securing to the main board.

* * * * *